(12) United States Patent
Yu et al.

(10) Patent No.: US 8,269,786 B2
(45) Date of Patent: Sep. 18, 2012

(54) METHOD FOR READING AND WRITING IMAGE DATA IN MEMORY

(75) Inventors: ChunJie Yu, Shanghai (CN); Wentao Ye, Shanghai (CN); Tsuyoshi Morimoto, Hyogo (JP); Hirofumi Odaguchi, Osaka (JP)

(73) Assignee: Ricoh Company, Ltd., Tokyo (JP)

( * ) Notice: Subject to any disclaimer, the term of this patent is extended or adjusted under 35 U.S.C. 154(b) by 774 days.

(21) Appl. No.: 12/474,507

(22) Filed: May 29, 2009

(65) Prior Publication Data
US 2009/0295817 A1    Dec. 3, 2009

(30) Foreign Application Priority Data

Jun. 3, 2008   (CN) .......................... 2008 1 0109420

(51) Int. Cl.
*G06F 12/06*    (2006.01)

(52) U.S. Cl. .................. 345/571; 345/569; 345/574

(58) Field of Classification Search .................... None
See application file for complete search history.

(56) References Cited

U.S. PATENT DOCUMENTS 7,394,465 B2 *   7/2008   Toni .............................. 345/531

* cited by examiner

*Primary Examiner* — Jin-Cheng Wang
*Assistant Examiner* — Weiming He
(74) *Attorney, Agent, or Firm* — Dickstein Shapiro LLP

(57) ABSTRACT

A method for reading and writing a memory having n rows and A columns includes a first step of writing data in 0th to (n−2)th rows by a first technique; a second step of writing data in (n−1)th row per column and reading data in the 0th section by a second technique; a third step of writing data in 0th to (n−2)th sections by a third technique and reading data in 1st to (n−1)th sections by the second technique, a fourth step of writing data in the (n−1)th section by the third technique and reading data in 0th row by a fourth technique; a fifth step of writing data in 0th to (n−2)th rows by the first technique and reading data in 1st to (n−1)th rows by the fourth technique; and a sixth step of returning to the second step.

5 Claims, 17 Drawing Sheets

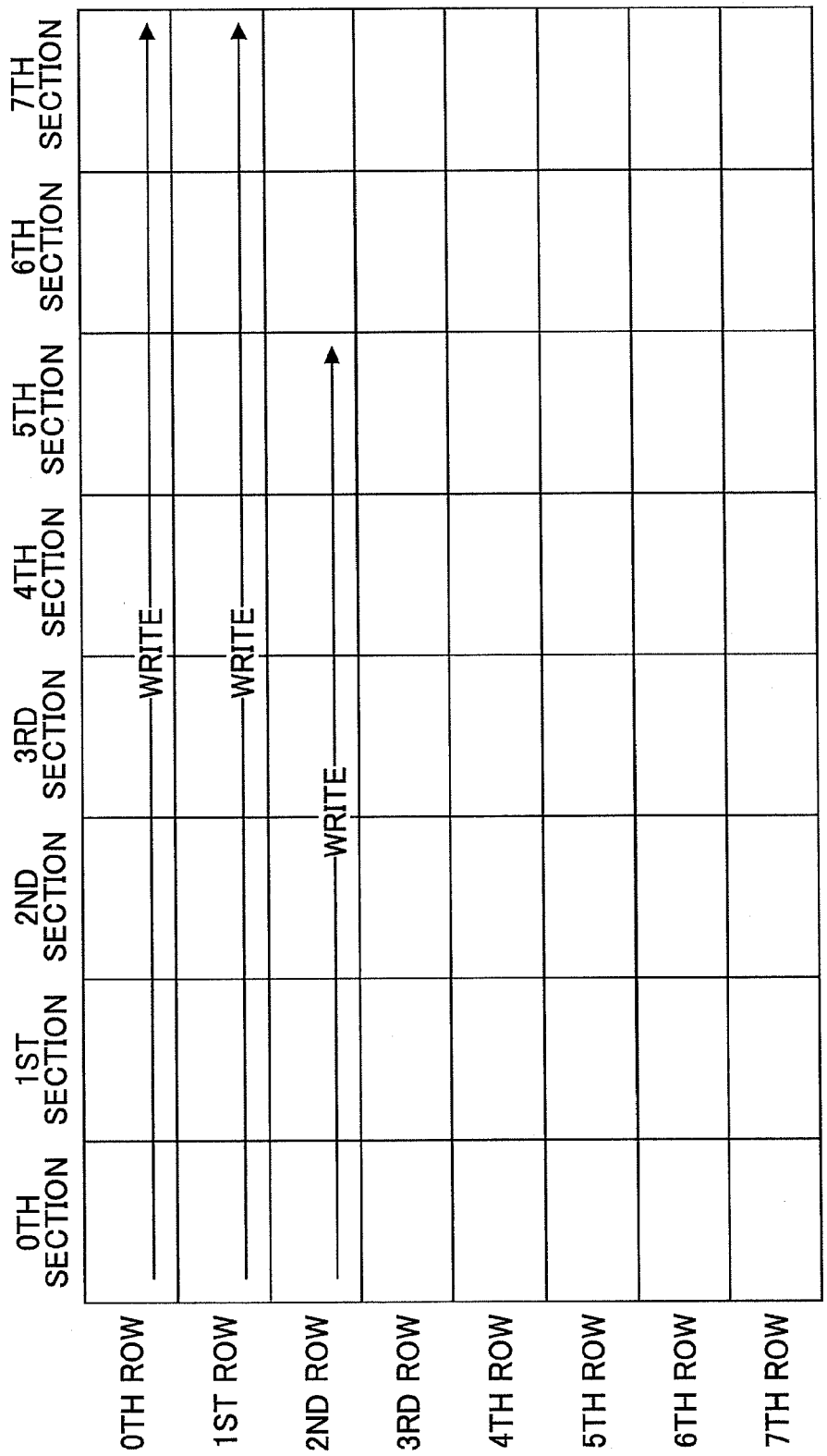

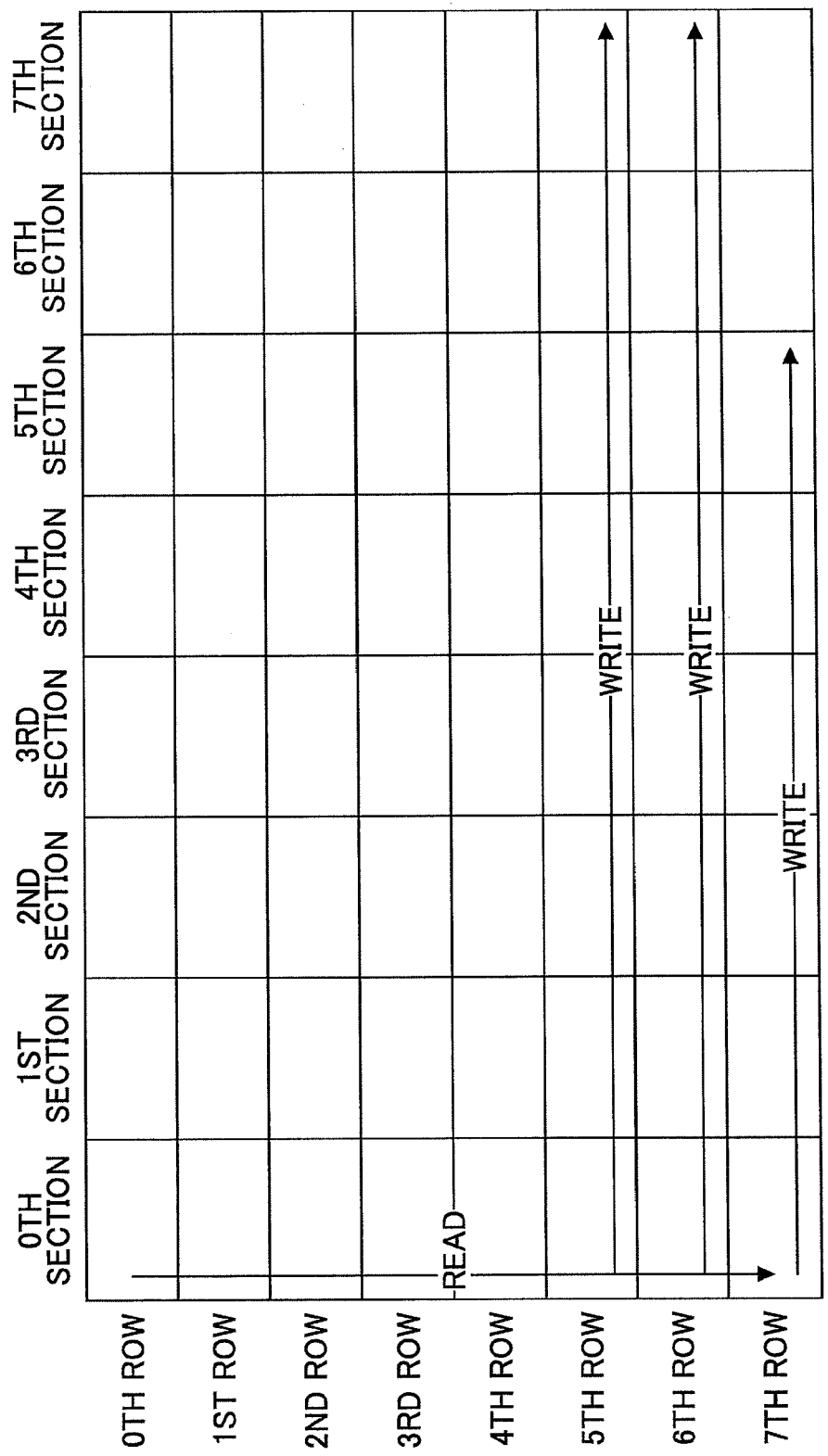

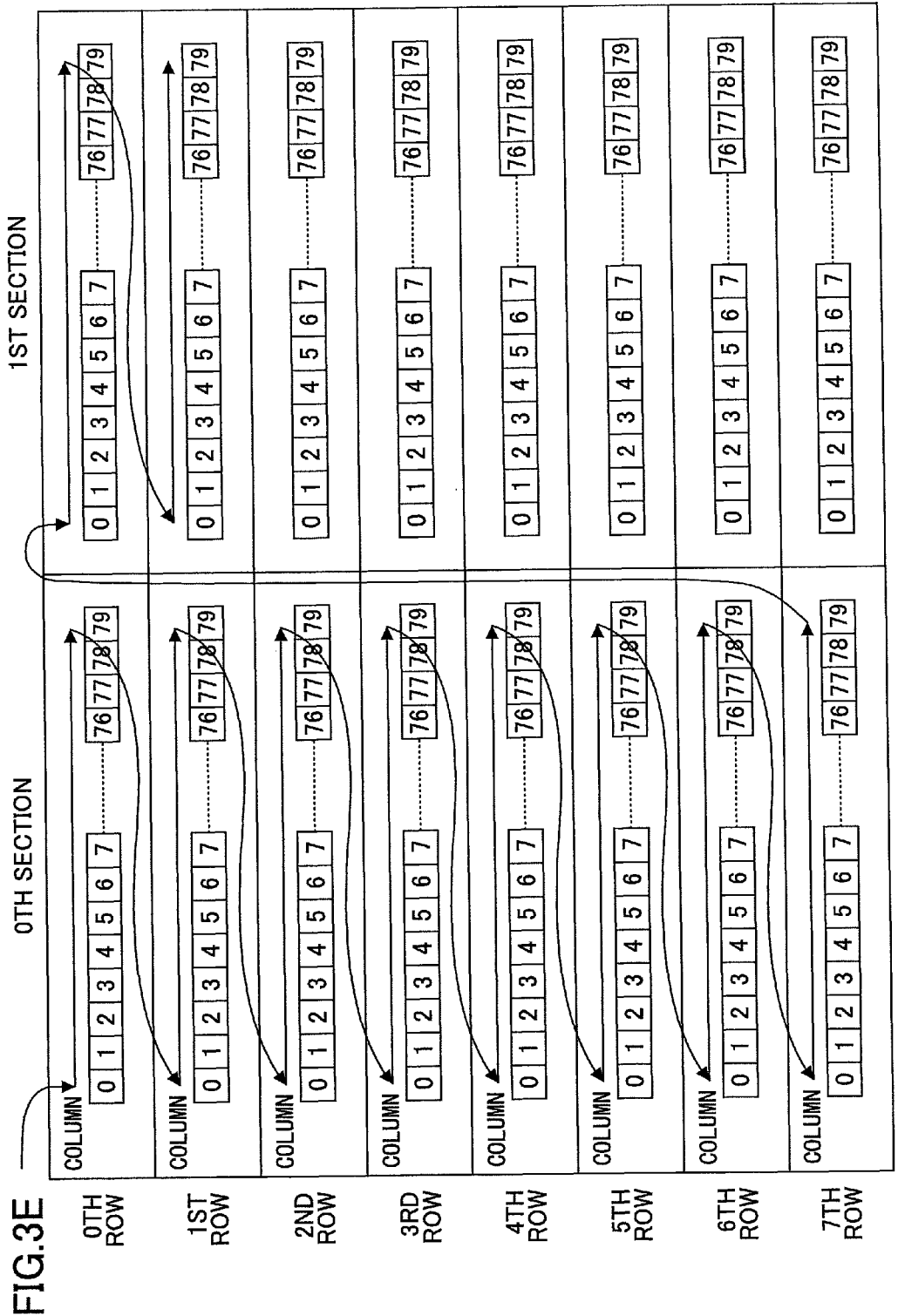

FIG.3F

| | 0TH SECTION | 1ST SECTION | 2ND SECTION | 3RD SECTION | 4TH SECTION | 5TH SECTION | 6TH SECTION | 7TH SECTION |
|---|---|---|---|---|---|---|---|---|
| 0TH ROW | | | | | | | | |
| 1ST ROW | | | | | | | | |
| 2ND ROW | | | | | | | | |
| 3RD ROW | →WRITE────────→ | →READ─────────→ | | | | | | |
| 4TH ROW | | | | | | | | |
| 5TH ROW | | | | | | | | |
| 6TH ROW | | | | | | | | |
| 7TH ROW | | | | | | | | |

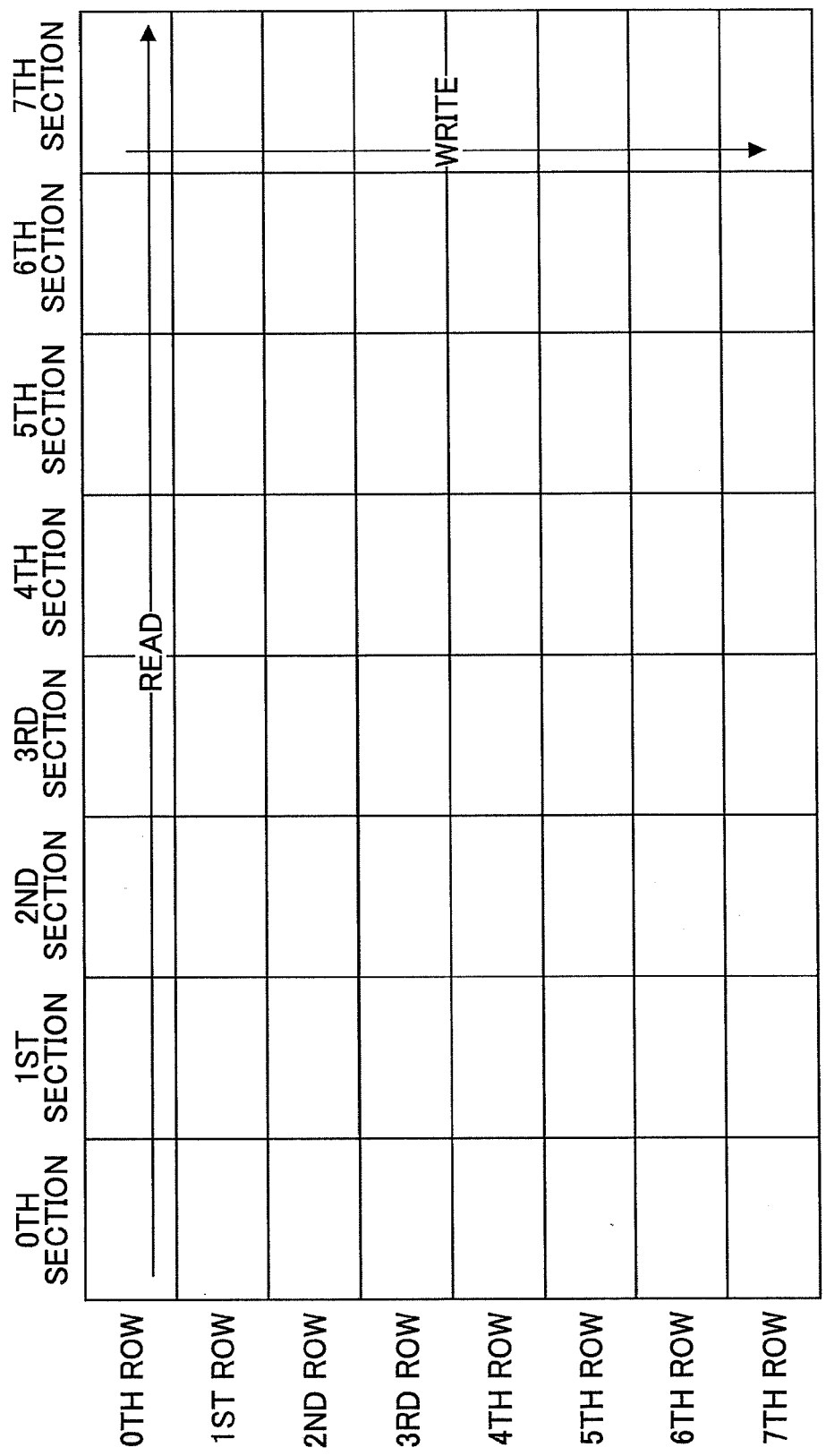

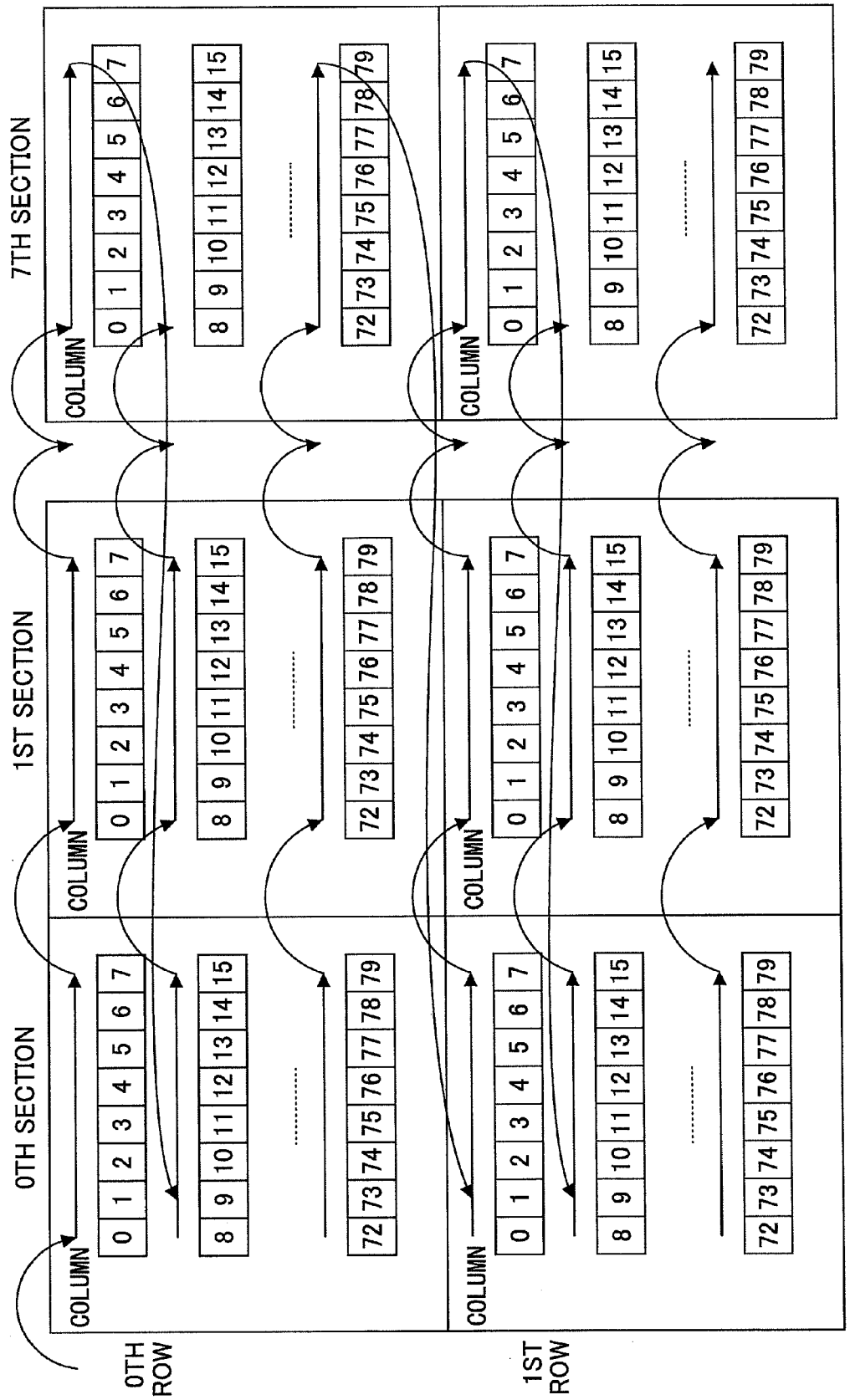

FIG.3I

| | 0TH SECTION | 1ST SECTION | 2ND SECTION | 3RD SECTION | 4TH SECTION | 5TH SECTION | 6TH SECTION | 7TH SECTION |
|---|---|---|---|---|---|---|---|---|
| 0TH ROW | | | | —WRITE→ | | | | |
| 1ST ROW | | | | —READ→ | | | | |
| 2ND ROW | | | | | | | | |
| 3RD ROW | | | | | | | | |
| 4TH ROW | | | | | | | | |
| 5TH ROW | | | | | | | | |
| 6TH ROW | | | | | | | | |
| 7TH ROW | | | | | | | | |

METHOD FOR READING AND WRITING IMAGE DATA IN MEMORY

BACKGROUND OF THE INVENTION

1. Field of the Invention

The present invention generally relates to a method for reading and writing image data in a memory, and more specifically, to a method for inputting image data in a memory in a data stream and outputting the image data from the memory in data blocks.

2. Description of the Related Art

Image data are expressed in a data stream generated by progressive scanning. Many standard algorithms for image processing (for example, JPEG, M-JPEG, DV, MPEG2, MPEG4, H.261, and H.263) employ an encoding technique using data blocks as processing units. In image processing, image data expressed in a data stream are stored and then outputted to an encoder in data block units. Therefore, it is necessary to input data in a memory in a data stream and then output the data from the memory in data blocks.

In a conventional method for reading and writing data in a memory, data have been read and written by using two cache memories having the same size in turn. As for data in a format of the JPEG specification, for example, data to be encoded undergo forward discrete cosine transformation in units of data blocks each formed of 8×8 pixels by a JPEG protocol. Therefore, in general, a memory having 16 rows (0th to 15th rows) in total, in which each cache has 8 rows, has been required. A specific procedure of the conventional method to read and write data in the memory is as follows.

1) Data are sequentially written in 0th to 7th rows by a row and column sequential access technique (hereinafter also referred to as a first technique). By the row and column sequential access technique, data are first written sequentially in, for example, columns of the 0th row, then sequentially written in columns of the 1st row, and in subsequent rows in this manner.

2) Data are sequentially written in 8th to 15th rows by the first technique, and the data of the 0th to 7th rows are read out in units of data blocks of 8×8 pixels. That is, all the data in the 0th to 7th rows are read out by sequentially reading a data block of {0th to 7th rows; 0th to 7th columns}, a data block of {0th to 7th rows; 8th to 15th columns}, a data block of {0th to 7th rows; 16th to 23rd columns} . . . and the like. Since the data are written and read with the same speed, writing of the data in the 8th to 15th rows is finished at the same time as reading of the data of the 0th to 7th rows is finished.

3) Data are sequentially written in the 0th to 7th rows by the first technique, and the data of the 8th to 15th rows are read out in units of data blocks of 8×8 pixels. That is, first, a data block of {8th to 15th rows; 0th to 7th columns} is read, then a data block of {8th to 15th rows; 8th to 15th columns} is read, a data block of {8th to 15th rows; 16th to 23rd columns} is read . . . and the like until all the data in the 8th to 15th rows are read out. Then, the procedure returns to step 2.

However, two bytes are required to display data of one pixel. Therefore, each cell in rows and columns of the memory is defined to have two bytes instead of one byte, for convenience.

For a VGA (Video Graphics Array) image whose resolution is 640×480, for example, a memory having 16 rows each having 640 pixels has been required. Since one pixel requires two bytes, 640×16×2=20480 bytes have been required.

Figure 1B:
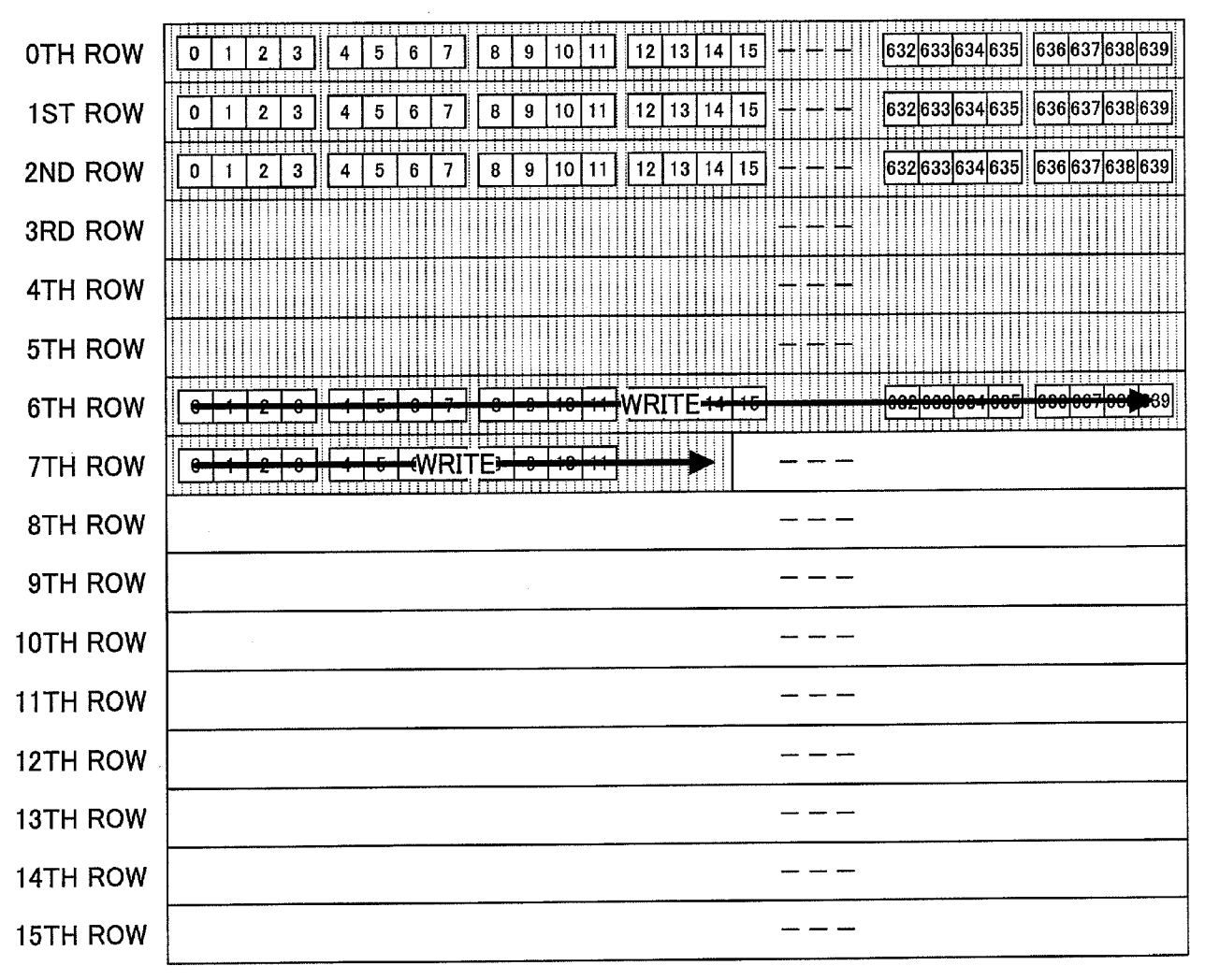
Figure 1D:
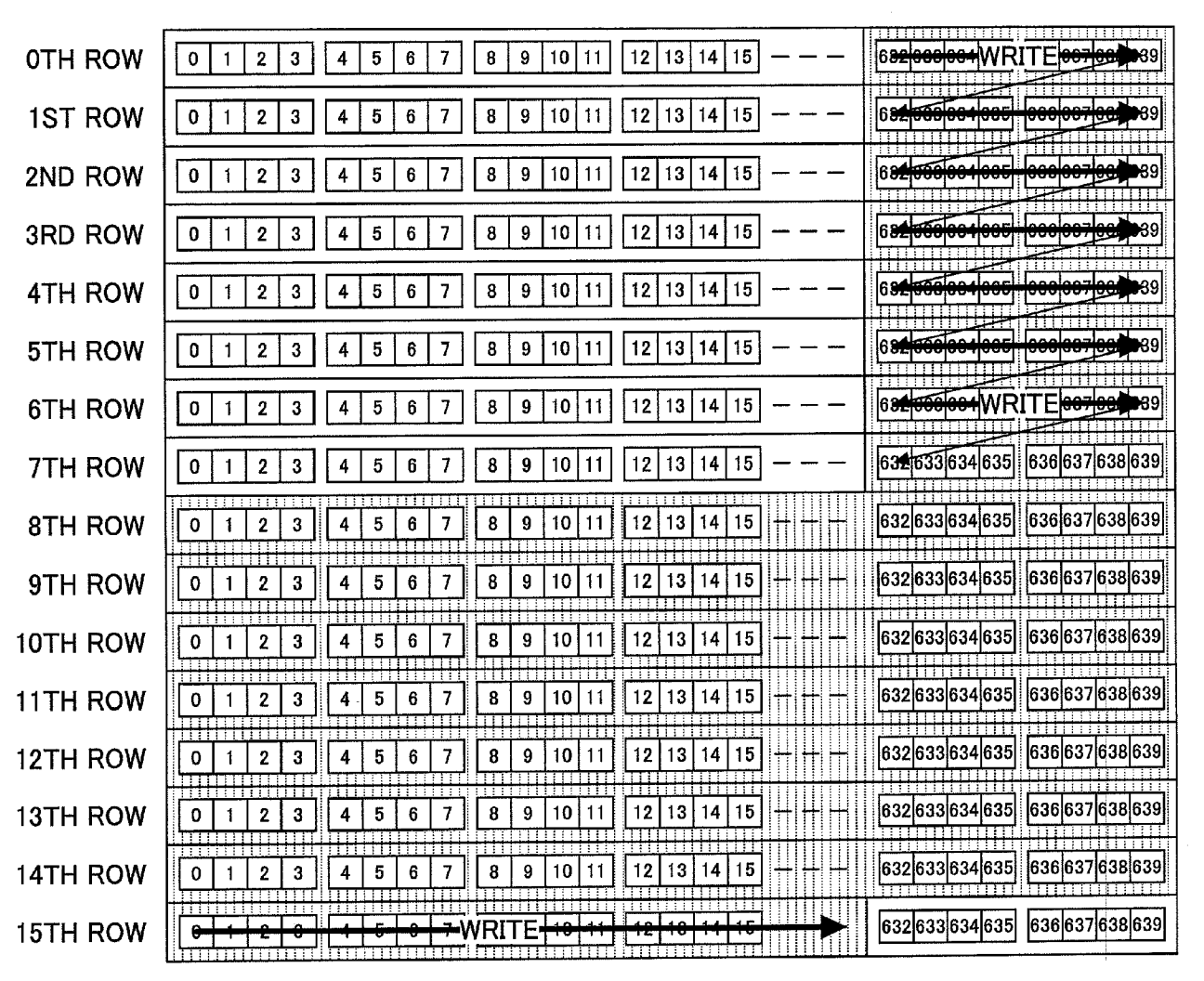

FIGS. 1A to 1F show specific processes of the conventional method for reading and writing data in a memory. For convenience, each cell in FIGS. 1A to 1F indicates two bytes, representing data of one pixel. FIG. 1A shows an initial state of writing data, in which data start to be written in a cell at a 0th row and a 0th column and then written in cells along the 0th row. FIG. 1B shows where writing of the data in the 0th to 7th rows is finished. FIG. 1C shows where data start to be written in the 8th row, and at the same time the written data start to be read out. The data are read out in units of data blocks of 8×8 pixels by the first technique. That is, first, a data block of {0th to 7th rows; 0th to 7th columns} is read out, and then a data block of {0th to 7th rows; 8th to 15th columns} is read out. FIG. 1D shows where writing of the data in the 8th to 15th rows is going to be finished. At this time, the last data block of {0th to 7th rows; 632nd to 639th columns} in the 0th to 7th rows is being read out as well. FIG. 1E shows where data start to be written again from the cell at the 0th row and 0th column, and at the same time, the data of the 8th to 15th rows are read out in units of data blocks of 8×8 pixels, by the first technique. That is, a data block of {8th to 15th rows; 0th to 7th columns} is read out, and then a data block of {8th to 15th rows; 8th to 15th columns} is read out. FIG. 1F shows where writing of data in the 0th to 7th rows is going to be finished. At this time, the last data block of {8th to 15th rows; 632nd to 639th columns} in the 8th to 15th rows is being read out as well.

As is clear from the above-described procedure, relatively many caches are required in the conventional method for reading and writing data in a memory since data are written and read to/from two caches in turn. With the advancement of image processing techniques, resolutions of images have become higher and a cache having more bytes has been in demand. When a memory does not have sufficient memory capacity, image data cannot be read or written from/to it. Thus, hardware at higher cost is required for reading and writing a high resolution image.

Table 1 shows conventional image sizes and required memory bytes.

TABLE 1

| Image size | Resolution | Required bytes in memory (one pixel requires two bytes) |
|---|---|---|
| VGA | 640 × 480 | 640 × 16 × 2 = 20480 |
| SXGA | 1280 × 1024 | 1280 × 16 × 2 = 40960 |
| UXGA | 1600 × 1200 | 1600 × 16 × 2 = 51200 |
| QXGA | 2048 × 1576 | 2048 × 16 × 2 = 65536 |

It is seen in Table 1 that a memory is required to have a considerably large number of bytes to read and write an image with a higher resolution. Therefore, to reduce the number of required cache bytes, a method for reading and writing a memory is required, whereby a cache can be more effectively used with respect to an image with a higher resolution.

SUMMARY OF THE INVENTION

It is an object of at least one embodiment of the present invention to provide a method for reading and writing data in a memory, whereby a cache can be more effectively used, in order to reduce the number of bytes required in the memory to read and write an image with the same resolution to half.

According to one aspect of the present invention, a method for reading and writing image data in a memory having n rows including 0th to (n−1)th rows and A columns including 0th to (A−1)th columns is provided. The image data are inputted to the memory in a data stream and outputted from the memory in data blocks each formed of n×n pixels that can be processed by an image processing algorithm, in which n is a number of rows and columns of the data block and A is an integer multiple of n×n and equal to or greater than a horizontal resolution B of the image data. The memory is divided into n rows and n sections. Each of the n sections includes A/n columns and is divided into blocks each including n rows and n columns. The method includes a first step of sequentially writing the image data in front B/n columns of the n sections in the 0th to (n−2)th rows by a row and column sequential write technique to sequentially write the columns per row; a second step of sequentially writing the image data in the front B/n columns of the n sections in the (n−1)th row per column, and reading the image data in the front B/n columns of the 0th section by a n-column data sequential row read technique to sequentially read the n rows and n columns in a row-major order in each successive one of the blocks, so that the read image data form the data blocks each formed of n×n pixels; a third step of sequentially writing the image data in the front B/n columns of the 0th to (n−2)th sections by a section and row sequential write technique to sequentially write the B/n columns and n rows in a row-major order in each successive one of the sections, and sequentially reading the image data in the front B/n columns of the 1st to (n−1)th sections by the n-column data sequential row read technique performed for each successive section, such that the image data are written in a k-th section when the image data are read out from a (k+1)th section, in which k is 0 through (n−2), so that the read image data form the data blocks each formed of n×n pixels; a fourth step of writing the image data in the front B/n columns in the (n−1)th section per row, and sequentially reading the image data in the front B/n columns of each section in the 0th row by an n-column data sequential read technique in which, in sequence, n columns of a first block in the 0th section are read, followed by n columns of a first block in the next section, and so on until n columns of a first block in the (n−1)th section are read, then reading n columns in the next blocks of the respective 0th through (n−1)th sections in the same sequential manner as that of the first blocks, and so on until the last blocks of the respective 0th through (n−1)th sections have been read, so that the read image data form the data blocks each formed of n×n pixels; a fifth step of sequentially writing image data in the front B/n columns of the n sections in the 0th to (n−2)th rows by the row and column sequential write technique, and sequentially reading out the image data in the front B/n columns of each section of the 1st to (n−1)th rows by the n-column data sequential section read technique performed for each successive row, such that the image data are written in a k-th row when the image data are read out from a (k+1)th row, in which k is 0 through (n−2), so that the read image data form the data blocks each formed of n×n pixels; and a sixth step of returning to the second step.

According to another aspect of the present invention, a method for reading and writing image data in a memory having n rows including 0th to (n−1)th rows and A columns including 0th to (A−1)th columns is provided. The image data are inputted to the memory in a data stream and outputted from the memory in data blocks each formed of n×n pixels that can be processed by an image processing algorithm, in which n is a number of rows and columns of the data block and A is an integer multiple of n×n and equal to or greater than a horizontal resolution B of the image data. The memory is divided into n rows and n sections. Each of the n sections includes A/n columns and is divided into blocks each including n rows and n columns. The method includes a first step of sequentially writing the image data in front B/n columns of the 0th to (n−2)th sections by a section and row sequential write technique to sequentially write the B/n columns and n rows in a row-major order in each successive one of the sections; a second step of sequentially writing the image data in the front B/n columns in the (n−1)th section per row, and sequentially reading out the image data in the front B/n columns of each section in the 0th row by an n-column data sequential read technique in which, in sequence, n columns of a first block in the 0th section are read, followed by n columns of a first block in the next section, and so on until n columns of a first block in the (n−1)th section are read, then reading n columns in next blocks of the respective 0 through (n−1)th sections in the same sequential manner as that of the first block, and so on until last blocks of the respective 0th through (n−1)th sections have been read, so that the read image data form the data blocks each formed of n×n pixels; a third step of sequentially writing the image data in the front B/n columns of the n sections in the 0th to (n−2)th rows by a row and column sequential write technique to sequentially write the columns per row, and sequentially reading the image data in the front B/n columns in each section of the 1st to (n−1)th row by the n-column data sequential section read technique performed for each successive row, such that the image data are written in a k-th row when the image data are read out from a (k+1)th row, in which k is 0 through (n−2), so that the read image data form the data blocks each formed of n×n pixels; a fourth step of sequentially writing the image data in the front B/n columns of the n sections in the (n−1)th row per column, and sequentially reading the image data in the front B/n columns of the 0th section by a n-column data sequential row read technique to sequentially read the n rows and n columns in a row-major order in each successive one of the blocks, so that the read image data form the data blocks each formed of n×n pixels; a fifth step of sequentially writing the image data in the front B/n columns of the 0th to (n−2)th sections by the section and row sequential write technique performed for each successive section, and sequentially reading the image data in the front B/n columns of the 1st to (n−1)th sections by the n-column data sequential row read technique performed for each successive section, such that the image data are written in a k-th section when the image data are read out from a (k+1)th section, in which k is 0 through (n−2), so that the read image data form the data blocks each formed of n×n pixels; and a sixth step of returning to the second step.

BRIEF DESCRIPTION OF THE DRAWINGS

FIGS. 1A to 1F are diagrams showing processes of a conventional method for reading and writing data in a memory;

FIGS. 3A to 3I are diagrams showing processes of a method for reading and writing data in a memory, according to the present invention.

DETAILED DESCRIPTION OF THE PREFERRED EMBODIMENTS

Embodiments of the present invention are described below with reference to the drawings.

First, a specific process of reading and writing data in a memory according to the present invention is described with an example of inputting VGA image data and outputting the data to be processed by a JPEG algorithm. When JPEG data are encoded, forward discrete cosine transformation is required to be performed on units of data blocks each formed of 8×8 pixels. Therefore, a data block formed of 8×8 pixels is outputted at each time. By the conventional method, two caches having 8×640×2 bytes have been required to read and write a VGA image (640×480); however, only one cache having 8×640×2 bytes is required by the method for reading and writing data in a memory according to the present invention.

Figure 1A:
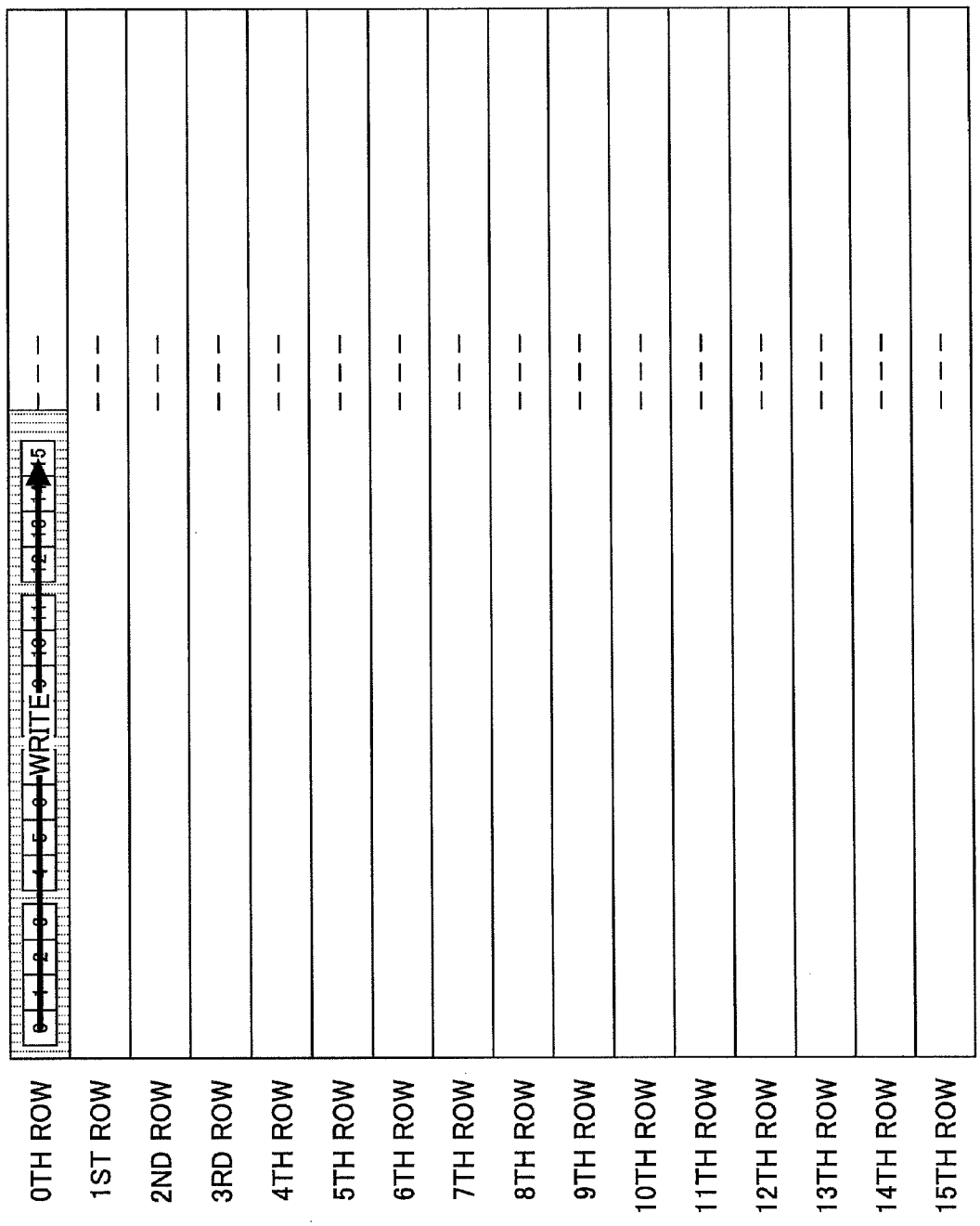
Figure 1C:
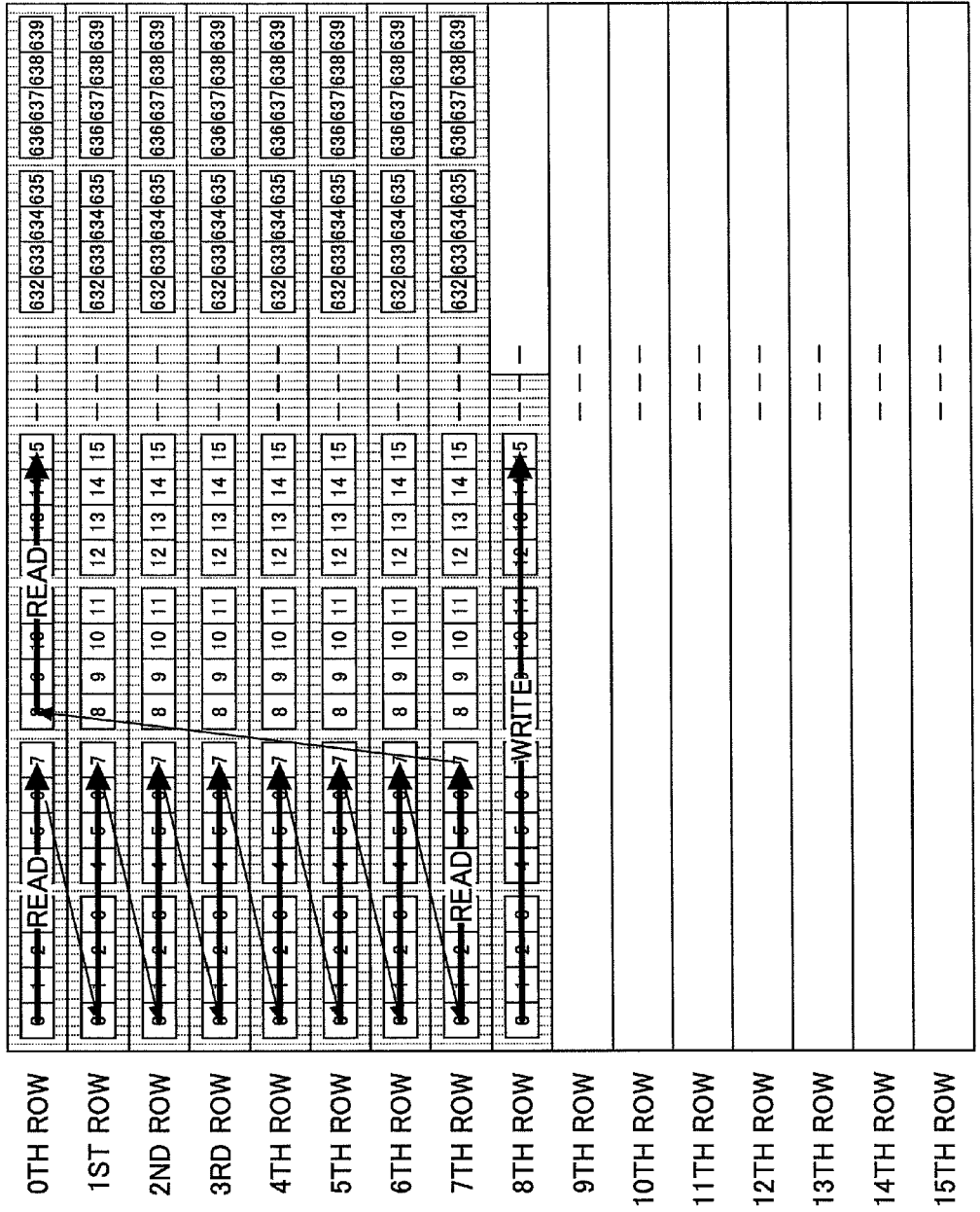
Figure 1E:
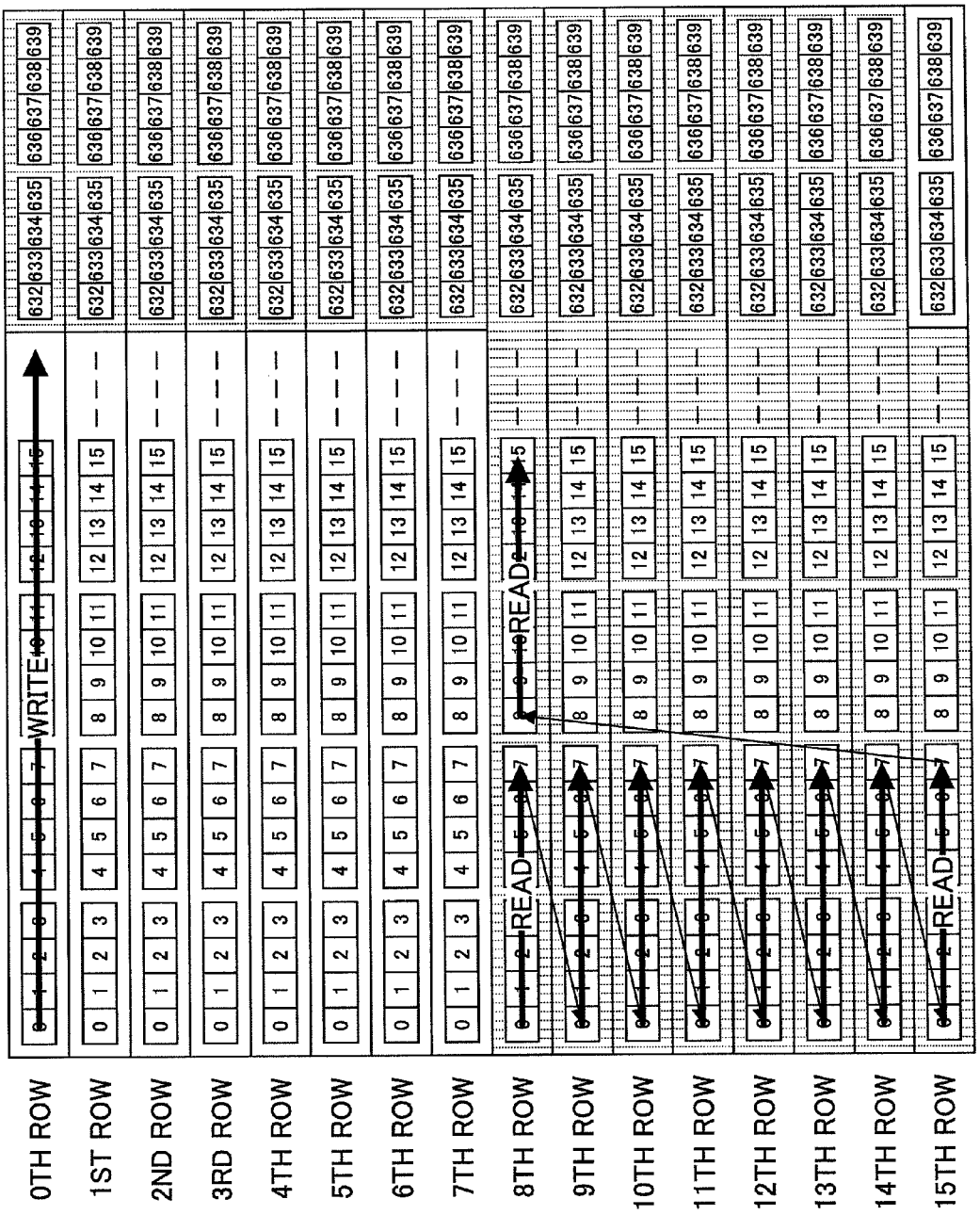
Figure 1F:
Figure 1F:
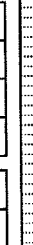
Figure 2:
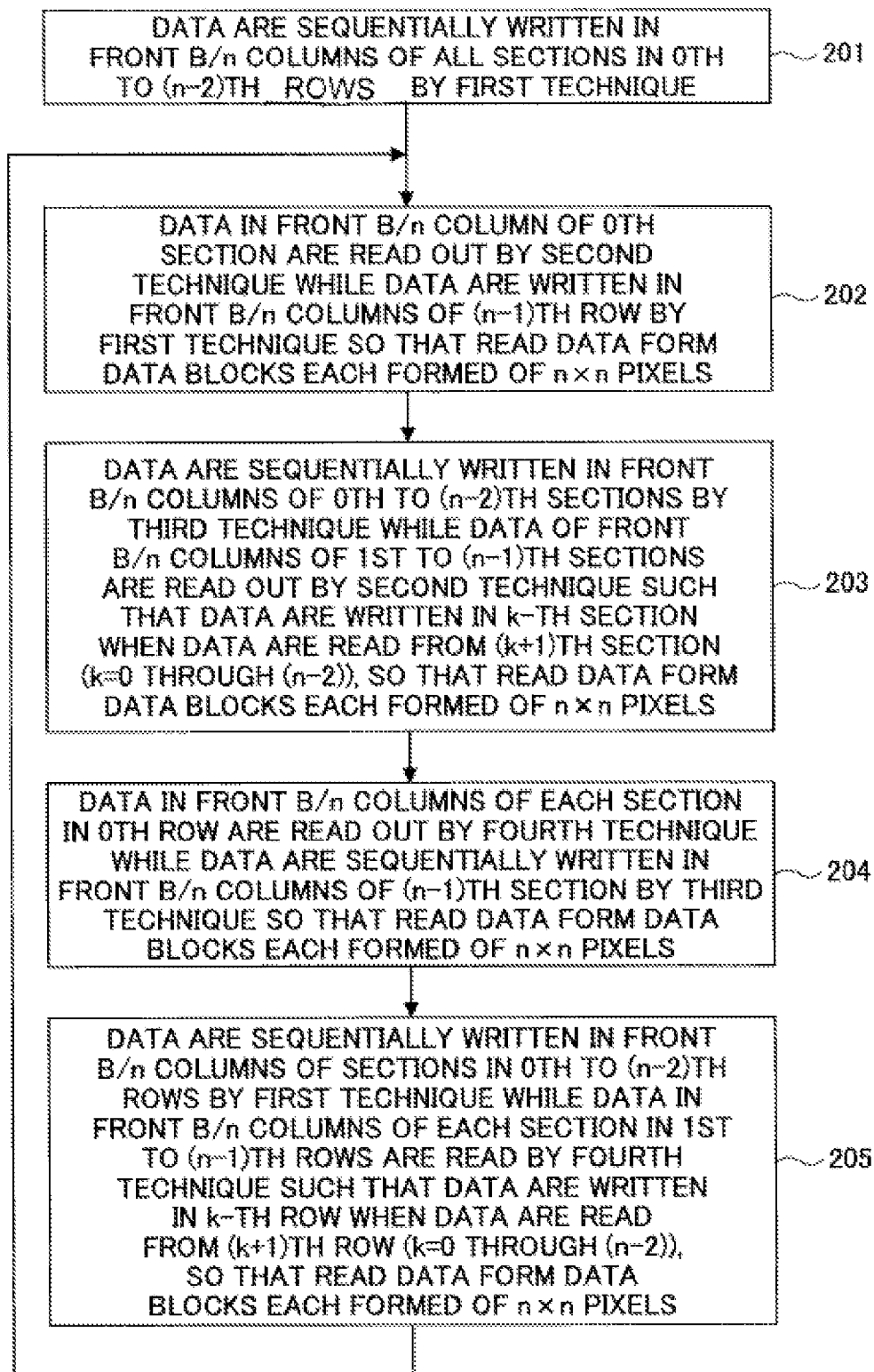
FIG. 2 is a flowchart of a process to read and write data in a memory, according to one embodiment of the present invention.

A memory has a size of n rows×A columns, in which n indicates the number of pixels in each row/each column of a data block that can be processed by an image processing algorithm. Since the JPEG algorithm can process a data block formed of 8×8 pixels, n=8. A is equal to or greater than a horizontal resolution (number of horizontal pixels) B of an image format. Since VGA data provide a screen resolution of 640×480, B=640. Therefore, in this embodiment, a memory has a size of 8 rows×640 columns. That is, A=640. However, one pixel requires two bytes to display; therefore, two bytes in the memory are called one cell instead of calling one byte one cell, for convenience. FIG. 2 is a flowchart of reading and writing data in a memory, according to one embodiment of the present invention. FIGS. 3A to 3I show processes of a method for reading and writing data in a memory, of this embodiment. Hereinafter, the method for reading and writing a memory according to one embodiment of the present invention is described in specifics below with reference to FIGS. 2 and 3A through 3I.

First, a memory is divided into n rows×n sections. In this embodiment, the memory is divided into 8 rows×8 sections. Each of the 8 sections includes 80 columns. Reading and writing of data are performed from/to this memory as follows.

Figure 3B:
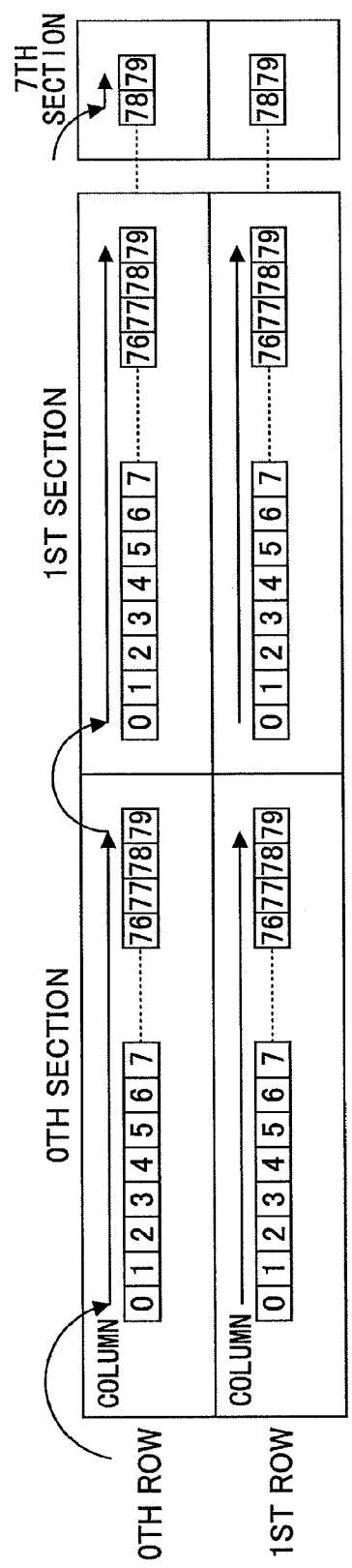

1) Data are sequentially written in front B/n columns of all the sections in 0th to (n−2)th rows by the row and column sequential access technique (first technique) (step 201). That is, as shown in FIGS. 3A and 3B, data are written in front 640/8=80 columns of the 0th to 7th sections sequentially in the 0th to 6th rows. In the case where A>B, that is the case where the number of columns in the memory is more than 640, data are not written in cells of columns subsequent to the 79th column in each section of the 0th to 6th rows.

Figure 3D:
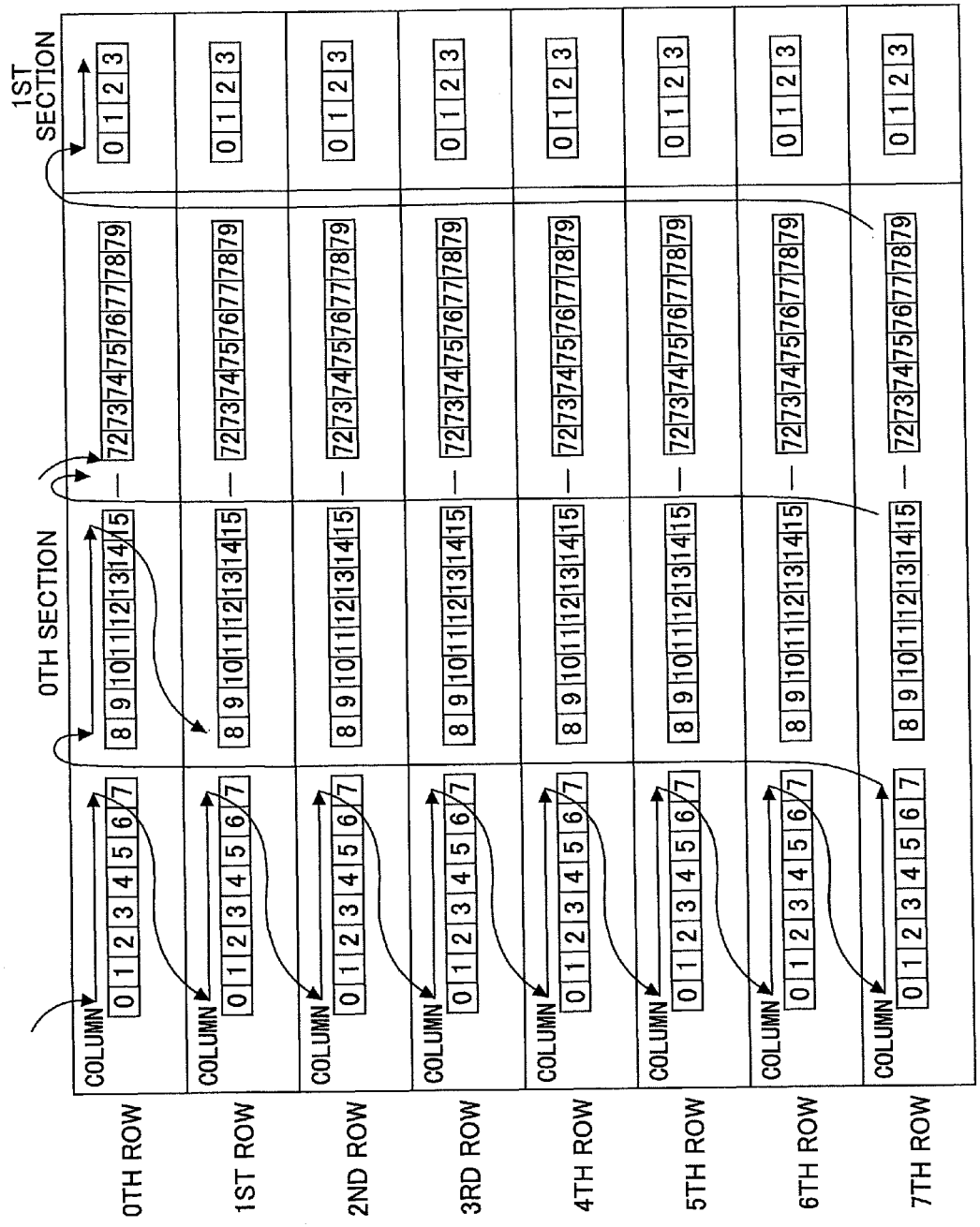

2) The data are sequentially written in front B/n columns of all sections in a (n−1)th row per column, and the data of the front B/n columns in the 0th section are read out by a n-column data sequential row access technique (hereinafter also referred to as a second technique), so that the read data constitute data blocks each formed of n×n pixels (step 202). That is, as shown in FIG. 3C, data are sequentially written in front 80 columns of all the sections in the 7th row. When there are more than 640 columns in the memory, data are not written in cells of columns subsequent to the 79th column in each section of the 7th row. At the same time as writing data in the 7th row, the data of the 0th section start to be read out. As shown in FIG. 3D, when the data of the 0th section are read out, first, data of the 0th to 7th columns in the 0th section are sequentially read out so as to form a data block of {0th to 7th rows; 0th to 7th columns}, then data of 8th to 15th columns in the 0th section are sequentially read out so as to form a data block of {0th to 7th rows; 8th to 15th columns}, . . . and data of up to 72nd to 79th columns in the 0th section are read out in this manner so as to form a data block of {0th to 7th rows; 72nd to 79th columns}. This technique for reading data is called the n-column data sequential row access technique (second technique). When the number of columns in the memory is more than 640, data have not been written in the cells of the columns subsequent to the 79th column in each row of the 0th section. Therefore, data are not read out from these cells either.

3) Data are sequentially written in front B/n columns in the 0th to (n−2)th sections by a section and row sequential access technique (hereinafter also referred to as a third technique), while the data of the front B/n columns in the 1st to (n−1)th sections are sequentially read out per section by the second technique, so that the read data constitute the data blocks of n×n pixels. Data are written in a k-th section when the data are read from a (k+1)th section. Note that k=0 through n−2 (step 203). In specific, as shown in FIG. 3E, data are written in the front 80 columns of the 0th to 6th sections, starting from the 0th section. The data are written in the 0th row in the 0th section, 1st row in the 0th section, . . . and 7th row in the 0th section, and then in the 0th row in the 1st section, 1st row in the 1st section . . . in this manner sequentially up to the 7th row in the 6th section. This technique for writing data is called the section and row sequential access technique (third technique). When the number of columns in the memory is more than 640, data are not written in cells of the columns subsequent to the 79th column in each row of each section. As shown in FIG. 3F, the data are written in the 0th section by the third technique while the data in the front 80 columns of the 1st section are sequentially read out by the second technique. The read data constitute data blocks of 8×8 pixels. The data are read by a technique similar to step 202. First, data are written in the 1st section at the same time as reading the data in the 2nd section, . . . and data are written in the 6th section at the same time as reading the data in the 7th section. When the number of columns in the memory is more than 640, data have not been written in cells of the columns subsequent to the 79th column in each row of the 1st to 7th sections. Therefore, data are not read out from these cells either.

4) Data are sequentially written in the front B/n columns of the (n−1)th section, and the data in the front B/n columns of each section in the 0th row are sequentially read out per section by a n-column data sequential section access technique (hereinafter also referred to as a fourth technique), so that the read data constitute data blocks of n×n pixels (step 204). As shown in FIG. 3G, data are sequentially written in the front 80 columns of the 7th section by a technique similar to step 203. When the number of columns in the memory is more than 640, data are not written in cells in the columns subsequent to the 79th column in each row of the 7th section. At the same time as writing data in the 7th section, the data in the 0th row are read out. As shown in FIG. 3H, the data in the 0th row are read out as follows. In the 0th to 7th sections, data of 8 columns are sequentially read out to form data blocks of 8×8 pixels. That is, first, the data of the 0th to 7th columns in each of the 0th to 7th sections are sequentially read out to form a data block of 8×8 pixels. Second, data of the 8th to 15th columns in each of the 0th to 7th sections are sequentially read out to form a data block of 8×8 pixels. At a tenth time, data of the 72nd to 79th columns in each of the 0th to 7th sections are sequentially read out to form a data block formed of 8×8 pixels. This technique for reading data is called the n-column data sequential section access technique (hereinafter also referred to as a fourth technique). When the number of columns in the memory is more than 640, data have not been written in the cells of the columns subsequent to the 79th column in each section of the 0th row. Therefore, data are not read out of these cells either.

5) Data are sequentially written in the front B/n columns of all the sections in the 0th to (n−2)th rows by the first technique, while the data in the front B/n columns of each section in the 1st to (n−1)th rows are read by the fourth technique so that the read data constitute data blocks each formed of n×n pixels. Data are written in a k-th row when the data are read out from a (k+1)th row. Note that k=0 through n−2. The procedure returns to step 202 after this operation (step 205). In specific, as shown in FIG. 3I, data are sequentially written in the front B/n columns of the 0th to 7th sections in the 0th to 6th rows. When the number of columns in the memory is more than 640, data are not written in the cells of the columns subsequent to the 79th column in each section of each row. At the same time as writing data in the 0th to 7th sections in the 0th to 6th rows, the data of the front 80 columns in each section of the 1st to 7th rows are sequentially read out by the fourth technique performed per row, so that the read data constitute data blocks of 8×8 pixels. The data in each row are read out by a technique similar to step 204. In the case where the number of columns in the memory is more than 640, data have not been written in the cells of the columns subsequent to the 79th column in each section of the 1st to 7th rows. Therefore, data are not read from these cells either. When the data are written in the 6th row, the procedure returns to the state of FIG. 3C and is repeated.

Since the data are written and read out with the same speed, reading and writing of the data are generally completed at the same time in the above-described steps. When there is a delay in writing of the data, reading out of the data is delayed accordingly. When data are inputted, an interval is inserted between writings of each row. Therefore, even when there is a constant delay in the output of data, the delay does not influence the input of data. That is, the operations to read out the data, of steps 202, 203, 204, and 205, may be synchronized with or delayed from the operations to write data in the corresponding steps, as long as data are not read and written from/to the same cell simultaneously.

As described in the embodiment, by rationally designing the procedure of reading and writing data in a memory, VGA image data can be read and written by using one cache having a size of 8×640×2 bytes. Therefore, a cache can be effectively used and the number of required bytes can be reduced.

As described above, the method for reading and writing data in a memory according to the present invention is only applied to an image format having a horizontal resolution which is an integer multiple of n×n. When the conventional method for reading and writing a memory is used for an image whose horizontal resolution is not an integer multiple of n×n, not so many memory bytes are required. Since an image format with a high resolution generally has a horizontal resolution that is an integer multiple of n×n, the number of bytes required to be used can be reduced to half according to the method for reading and writing a memory of the present invention, compared to the conventional method.

Figure 4:
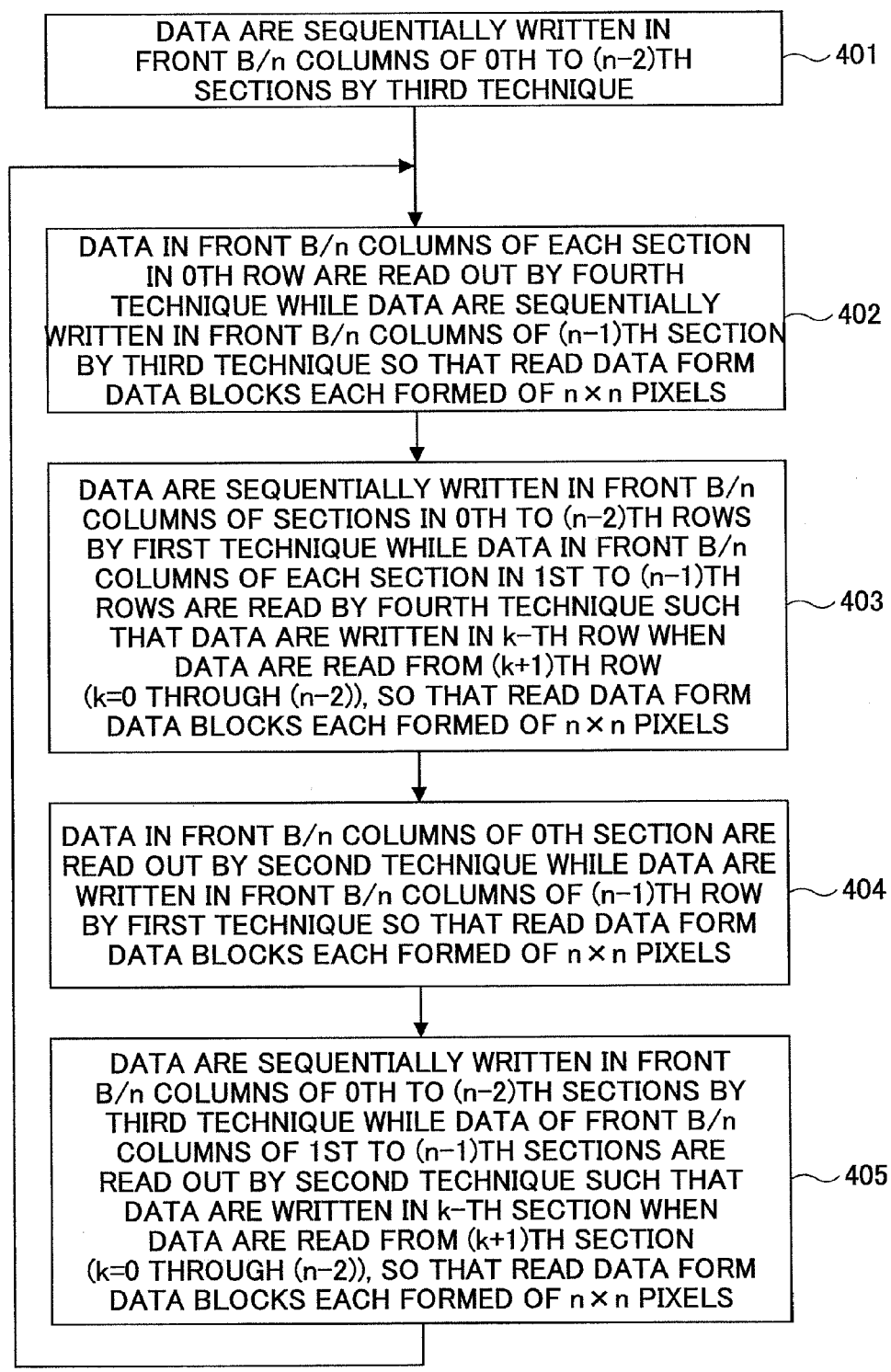
FIG. 4 is a flowchart of a process to read and write data in a memory, according to another embodiment of the present invention.

According to the above description, the data are read and written in each of two states. By repeating these two states of reading and writing data in a memory, a cache can be effectively used and cost of the memory can be reduced. According to the above-described steps, steps 202 and 203 correspond to one reading and writing state while steps 204 and 205 correspond to the other reading and writing state. Steps 202, 203, 204, and 205 constitute one loop of operations. In the embodiment, the loop starts from the row and column sequential access technique, which is the first technique. It can be easily conceived by those skilled in the art to start the loop of the steps of the present invention from the section and row sequential access technique, which is the third technique. FIG. 4 is a flowchart of a method for reading and writing data in a memory according to another embodiment of the present invention. A process of the method for reading and writing data in a memory according to another embodiment of the present invention is described below with reference to FIG. 4.

1) Data are sequentially written in front B/n columns of the 0th to (n−2)th sections by the section and row sequential access technique (third technique) (step S401). As shown in FIG. 3E, data are written in front 80 columns of the 0th to 6th sections by the section and row sequential access technique (third technique), starting from the 0th section. The data are sequentially written in the 0th row of the 0th section, 1st row of the 0th section, . . . up to the 7th row of the 0th section, then in the 0th row of the 1st section, 1st row of the 1st section . . . . up to the 7th row in the 6th section. When the number of columns in the memory is more than 640, data are not written in the cells of the columns subsequent to the 79th column of each section in each row.

2) Data are sequentially written in the front B/n columns of the (n−1)th section per row, and the data of the front B/n columns in each section of the 0th row are read out by the n-column data sequential section access technique (fourth technique), so as to form data blocks each formed of n×n pixels (step 402). As shown in FIG. 3G, data are written in the front 80 columns of the 7th section per row by the third technique. The data are written by a technique similar to step 401. Then, the data of the 0th row are requested to be read out. As shown in FIG. 3H, the data of the 0th row are read out as follows. Data of 8 columns in the 0th to 7th sections are sequentially read out, so as to constitute data blocks each formed of 8×8 pixels. That is, first, the data of the 0th to 7th columns in the 0th to 7th sections are read out, so as to constitute a data block of 8×8 pixels. Second, data of the 8th to 15th columns in the 0th to 7th sections are sequentially read out so as to constitute a data block of 8×8 pixels. At a tenth time, data of the 72nd to 79th columns in the 0th to 7th sections are sequentially read out so as to constitute a data block of 8×8 pixels. When the number of columns in the memory is more than 640, data have not been written in the cells of the columns subsequent to the 79th column in each section of the 0th row. Therefore, data are not read out from these cells either.

3) Data are sequentially written in the front B/n columns of all sections in the 0th to (n−2)th rows by the row and column sequential access technique (first technique), while the data of the B/n columns of each section in the 1st to (n−1)th rows are sequentially read out per row by the fourth technique, so that the read data constitute data blocks each formed of n×n pixels. Data are written in the k-th row when the data are read out from the (k+1)th row. Note that k=0 through n−2 (step 403). As shown in FIG. 3I, data are sequentially written in the front 80 columns of the 0th to 7th sections in the 0th to 6th rows. When the number of columns is more than 640, data are not written in the cells of the columns subsequent to the 79th column in each section of each row. At the same time as writing the data in the front 80 columns of the 0th to 7th sections in the 0th to 6th rows, the data of the front 80 columns in each section in the 1st to 7th rows are sequentially read out by the fourth technique, so that the data read every time constitute a data block formed of 8×8 pixels. The data in each row are read by a technique similar to step 402. If the number of columns in the memory is more than 640, data have not been written in the cells of the columns subsequent to the 79th column in each section of the 1st to 7th rows. Therefore, data are not read out of these cells either.

4) Data are written in the front B/n columns of all the sections in the (n−1)th row per column, and the data of the front B/n columns of the 0th section are read out by the n-column data sequential row access technique (second technique) so that the read data constitute data blocks each formed of n×n pixels (step 404). As shown in FIG. 3C, data are written in the front 80 columns of all the sections in the 7th row. When the number of columns in the memory is more than 640, data are not written in the cells of the columns subsequent to the 79th column in each section of the 7th row. At the same time as writing data in the 7th row, the data of the 0th section start to be read out. As shown in FIG. 3D, when the data in the 0th section are read out by the second technique, first, data of the 0th to 7th columns in the 0th section are read per row so as to form a data block of {0th to 7th rows; 0th to 7th columns}, data of 8th to 15th columns in the 0th section are read per row so as to form a data block of {0th to 7th rows; 8th to 15th columns}, ... and data of the 72nd to 79th columns in the 0th section are read so as to form a data block of {0th to 7th rows; 72nd to 79th columns}. If the number of columns in the memory is more than 640, data have not been written in the cells of columns subsequent to the 79th column in each row in the 0th section. Therefore, data are not read out of these cells either.

5) Data are sequentially written in the front B/n columns of the 0th to (n−2)th sections by the section and row sequential access technique (third technique), while the data in the front B/n columns of the 1st to (n−1)th sections are sequentially read out by the second technique performed per section, so that the read data constitute data blocks each formed of n×n pixels. Data are written in a k-th section when the data are read from a (k+1)th section. Note that k=0 through n−2. The procedure returns to step 402 after this operation (step 405). As shown in FIG. 3E, data are written in the front 80 columns of the 0th to 6th sections by the section and row sequential access technique (third technique), starting from the 0th section. The data are sequentially written in the 0th row of the 0th section, 1st row of the 0th section, ... and then the 7th row in the 0th section, then in the 0th row of the 1st section, 1st row of the 1st section, ... and the like in this manner up to the 7th row in the 6th section. If the number of columns in the memory is more than 640, data are not written in the cells of columns subsequent to the 79th column in each row of the 0th to 6th sections. As shown in FIG. 3F, the data are written in the 0th section, and the data in the front 80 columns of the 1st section are sequentially read out by the second technique performed per section, so that the read data constitute data blocks each formed of 8×8 pixels. The data are read by the technique similar to step 404. While data are written in the 1st section, data are read from the 2nd section, while data are written in the 2nd section, data are read from the 3rd section, ... and while data are written in the 6th section, data are read from the 7th section. If the number of columns in the memory is more than 640, data have not been written in the cells of columns subsequent to the 79th column of the 1st to 7th sections in each row. Therefore, data are not read out of these cells either. When data are written in the 6th section, the procedure returns to the state of FIG. 3G and is repeated.

Since the data are written and read out with the same speed, reading and writing of the data are generally completed at the same time in the above-described steps. When there is a delay in writing of the data, reading out of the data is delayed accordingly. When data are inputted, there is an interval inserted between writings of each row. Therefore, even when there is a constant delay in the output of data, the delay does not influence the input of data. That is, the operations to read out the data of steps 402, 403, 404, and 405 may be synchronized with or delayed from the operations to write data in the corresponding steps, as long as data are not read and written from/to the same cell simultaneously.

By rationally designing a procedure to read and write data in a memory, two caches having the same size are not required to be used in turn to read and write data from/to the memory, but only one cache is required to read and write data from/to the memory. Therefore, a cache is efficiently used and the number of bytes used can be reduced.

Although the invention has been described with respect to specific embodiments for a complete and clear disclosure, the appended claims are not to be thus limited but are to be construed as embodying all modifications and alternative constructions that may occur to one skilled in the art that fairly fall within the basic teachings herein set forth.

This patent application is based on Chinese Patent Application No. 200810109420 filed on Jun. 3, 2008, the entire contents of which are hereby incorporated herein by reference.

What is claimed is:

1. A method for reading and writing image data in a memory having n rows including 0th to (n−1)th rows and A columns including 0th to (A−1)th columns, to which memory the image data are inputted in a data stream and from which memory the image data are outputted in data blocks each formed of n×n pixels that can be processed by an image processing algorithm, in which n is a number of rows and columns of the data block and A is an integer multiple of n×n and equal to or greater than a horizontal resolution B of the image data, said memory being divided into n rows and n sections, each of said n sections including A/n columns and divided into blocks each comprised of n rows and n columns, said method comprising:

a first step of sequentially writing the image data in front B/n columns of the n sections in the 0th to (n−2)th rows by a row and column sequential write technique to sequentially write the columns per row;

a second step of sequentially writing the image data in the front B/n columns of the n sections in the (n−1)th row per column, and reading the image data in the front B/n columns of the 0th section by a n-column data sequential row read technique to sequentially read the n rows and n columns in a row-major order in each successive one of the blocks, so that the read image data form the data blocks each formed of n×n pixels;

a third step of sequentially writing the image data in the front B/n columns of the 0th to (n−2)th sections by a section and row sequential write technique to sequentially write the B/n columns and n rows in a row-major order in each successive one of the sections, and sequentially reading the image data in the front B/n columns of the 1st to (n−1)th sections by the n-column data sequential row read technique performed for each successive section, such that the image data are written in a k-th section when the image data are read out from a (k+1)th section, in which k is 0 through (n−2), so that the read image data form the data blocks each formed of n×n pixels;

a fourth step of writing the image data in the front B/n columns in the (n−1)th section per row, and sequentially reading the image data in the front B/n columns of each section in the 0th row by a n-column data sequential section read technique in which, in sequence, n columns of a first block in the 0th section are read, followed by n columns of a first block in the next section, and so on until n columns of a first block in the (n−1)th section are read, then reading n columns in the next blocks of the respective 0th through (n−1)th sections in the same sequential manner as that of the first blocks, and so on until the last blocks of the respective 0th through (n−1)th sections have been read, so that the read image data form the data blocks each formed of n×n pixels;

a fifth step of sequentially writing image data in the front B/n columns of the n sections in the 0th to (n−2)th rows by the row and column sequential write technique, and sequentially reading out the image data in the front B/n columns of each section of the 1st to (n−1)th rows by the n-column data sequential section read technique performed for each successive row, such that the image data are written in a k-th row when the image data are read out from a (k+1)th row, in which k is 0 through (n−2), so that the read image data form the data blocks each formed of n×n pixels; and a sixth step of returning to the second step.

2. A method for reading and writing image data in a memory having n rows including 0th to (n−1)th rows and A columns including 0th to (A−1)th columns, to which memory the image data are inputted in a data stream and from which memory the image data are outputted in data blocks each formed of n×n pixels that can be processed by an image processing algorithm, in which n is a number of rows and columns of the data block and A is an integer multiple of n×n and equal to or greater than a horizontal resolution B of the image data, said memory being divided into n rows and n sections, each of said n sections including A/n columns and divided into blocks each comprised of n rows and n columns, said method comprising:

a first step of sequentially writing the image data in front B/n columns of the 0th to (n−2)th sections by a section and row sequential write technique to sequentially write the B/n columns and n rows in a row-major order in each successive one of the sections;

a second step of sequentially writing the image data in the front B/n columns in the (n−1)th section per row, and sequentially reading out the image data in the front B/n columns of each section in the 0th row by a n-column data sequential section read technique in which, in sequence, n columns of a first block in the 0th section are read, followed by n columns of a first block in the next section, and so on until n columns of a first block in the (n−1)th section are read, then reading n columns in next blocks of the respective 0 through (n−1)th sections in the same sequential manner as that of the first block, and so on until last blocks of the respective 0th through (n−1)th sections have been read, so that the read image data form the data blocks each formed of n×n pixels;

a third step of sequentially writing the image data in the front B/n columns of the n sections in the 0th to (n−2)th rows by a row and column sequential write technique to sequentially write the columns per row, and sequentially reading the image data in the front B/n columns in each section of the 1st to (n−1)th row by the n-column data sequential section read technique performed for each successive row, such that the image data are written in a k-th row when the image data are read out from a (k+1)th row, in which k is 0 through (n−2), so that the read image data form the data blocks each formed of n×n pixels;

a fourth step of sequentially writing the image data in the front B/n columns of the n sections in the (n−1)th row per column, and sequentially reading the image data in the front B/n columns of the 0th section by a n-column data sequential row read technique to sequentially read the n rows and n columns in a row-major order in each successive one of the blocks, so that the read image data form the data blocks each formed of n×n pixels;

a fifth step of sequentially writing the image data in the front B/n columns of the 0th to (n−2)th sections by the section and row sequential write technique performed for each successive section, and sequentially reading the image data in the front B/n columns of the 1st to (n−1)th sections by the n-column data sequential row read technique performed for each successive section, such that the image data are written in a k-th section when the image data are read out from a (k+1)th section, in which k is 0 through (n−2), so that the read image data form the data blocks each formed of n×n pixels; and a sixth step of returning to the second step.

3. The method for reading and writing image data in the memory as claimed in claim 1, wherein n=8.

4. The method for reading and writing image data in the memory as claimed in claim 1, wherein when the image data are inputted with a delay, the image data are outputted with a delay.

5. The method for reading and writing image data in the memory as claimed in claim 1, wherein reading of the image data is synchronized with or delayed from writing of the image data in the second, third, fourth, and fifth steps.

* * * * *